Patented Feb. 7, 1933

1,896,162

UNITED STATES PATENT OFFICE

ALBERT S. CARTER, OF WILMINGTON, DELAWARE, AND FREDERICK B. DOWNING, OF CARNEYS POINT, NEW JERSEY, ASSIGNORS TO E. I. DU PONT DE NEMOURS & COMPANY, OF WILMINGTON, DELAWARE, A CORPORATION OF DELAWARE

POLYMER OF VINYL ACETYLENE AND PROCESS OF PRODUCING THE SAME

No Drawing.   Application filed December 19, 1930.   Serial No. 503,606.

This invention relates to the polymerization of unsaturated hydrocarbons and to the resulting products, and more particularly relates to the formation of novel unsaturated nonbenzenoid hydrocarbons by the polymerization of vinylacetylene.

Vinylacetylene was prepared and described by Willstatter and Wirth (Ber. 46, 535), their method of preparation being through the exhaustive methylation of 1,4-tetramethyldiaminobutene-2. This hydrocarbon has the molecular formula $C_4H_4$ and the structure $CH_2=CH-C\equiv CH$. It has also been prepared in small amounts by Nieuwland (Serial No. 305,866, filed September 13, 1928) and by Calcott and Downing (Serial No. 303,494, filed September 1, 1928) by polymerizing acetylene in the presence of a catalyst composed of a cuprous salt, metallic copper, a salt of a tertiary amine or ammonia, and water and/or suitable acids. Through the agency of this catalytic medium, acetylene is caused to react with itself to produce vinylacetylene, divinylacetylene and other hydrocarbons of higher molecular weight. These compounds have been readily separated and purified by simple known means of fractional distillation. The boiling point of vinylacetylene lies between 6° and 10° C.

In these catalytic processes as described by Nieuwland and Calcott and Downing in the above mentioned applications, the acetylene, activated by means of the cuprous copper, is caused to react to form straight chain hydrocarbons.

In a subsequent application of Nieuwland (Serial No. 330,415, filed January 4, 1929) a process for polymerizing a mixture containing the above described straight chain hydrocarbons is disclosed. The resulting product, however, by reason of the presence of acetylene polymers of various constitution, in part of straight chain structure, is an anonymous polymer mixture.

The object of the present invention is the production of substantially pure nonbenzenoid hydrocarbons which are polymers of vinyl acetylene and have the formula $(C_4H_4)_x$ in which $x$ may be any whole number greater than one. A further object is the preparation from acetylene of a hydrocarbon product free from straight chain hydrocarbons.

With these objects in view, we have discovered that if vinylacetylene be polymerized with itself alone and in the absence of a catalyst of the type disclosed by Nieuwland (Serial No. 305,866) and composed of a solution of cuprous chloride in the presence of ammonium salts, and preferably with the aid of heat, products of higher molecular weight and of the desired type are produced.

In the present invention, polymerization of vinylacetylene with itself also results in compounds with the formula $C_8H_8$, $C_{12}H_{12}$, etc., but they are quite different from the corresponding polymers formed in the Nieuwland processes, and it is believed that this is because their structure includes acetylenic side chains. Thus, it is believed that the $C_8H_8$ compound formed in the Nieuwland process has the formula shown as

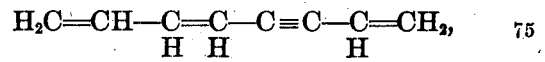

corresponding to the other straight chained members (i. e. vinyl- and divinylacetylene), whereas the compound corresponding to the formula $C_8H_8$ formed under the claims of the present invention is believed to be

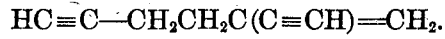

Regardless of the explanation, that there is a distinct difference in constitution is established by the fact that the tetramer of acetylene formed by the early Nieuwland process as well as the great majority of the product from the late Nieuwland process gives no test for acetlyenic hydrogen with ammoniacal cuprous chloride, whereas all of the non-resinous polymers formed by the polymerization of vinylacetylene according to the process of this invention, give a yellow acetylide, similar to the yellow cuprous salt or vinylacetylene itself when so reacted.

As will appear below the pure vinylacetylene may be polymerized under a variety of conditions, alone or in solution in an inert solvent and either in the presence or absence of polymerization catalysts, with the exceptions already mentioned.

During the polymerization the average molecular weight of the product increases with a simultaneous increase in viscosity, the product of course being a mixture of polymers in various stages of polymerization. Also, during the process the solubility of the product decreases and the boiling point increases with the resulting formation of less volatile material. As the less volatile portion increases, first a portion of the product soluble in acetone becomes insoluble in alcohol; thereafter the alcohol insoluble portion increases and a portion of it becomes insoluble in acetone but soluble in benzene; with continued heating, the acetone insoluble portion increases and a small amount of material is formed which is insoluble in benzene. Following the appearance of this benzene insoluble material, the entire mass becomes semi-solid then gels; at this point, generally 30-60% of the mass is non-volatile. If heating is continued, the gel becomes solid, forming a transparent brittle resin which becomes extremely hard as the heating is continued.

If the process is interrupted at a point where the product is a liquid containing about 15-30% non-volatile, the unpolymerized material may be distilled off and repolymerized, leaving an oily residue which is a liquid and 100% non-volatile at 100° C. and ordinary pressure. This new synthetic drying oil is still unsaturated and will absorb oxygen and halogens, the rapidity of oxygen and bromine absorption being greater, the lower the degree of polymerization.

The essential features of this invention are disclosed in the following examples. It will be understood that these examples are furnished merely by way of illustration and that the conditions therein disclosed are susceptible to wide variation.

*Example I*

One hundred parts of liquid vinylacetylene are sealed in a closed tube at −10° together with an equal volume of air (gaseous) and the system heated at 80-90° for 15 hours. Upon opening the tube and distilling off the unpolymerized material at substantially 100° C., 10-12% of the product remains as a thick, viscous, straw-colored oil. This material is soluble in benzene; rapidly absorbs bromine, rapidly oxidizes with air or other oxidizing agents, and reacts with ammoniacal cuprous copper or silver salts to yield typical acetylides. It cannot be distilled under any known conditions of temperature and pressure which will not result in decomposition.

*Example II*

Example I may be repeated, extending the period of polymerization to 25-30 hours, thus obtaining a 15-20% yield of the non-volatile viscous product of Example I on distillation at 100° C.

*Example III*

Example I may be repeated, but carrying out the heating at 100-110°, thus obtaining 20-25% polymerization to a non-volatile product in 6 hours.

*Example IV*

Liquid vinylacetylene is sealed in a closed tube at about −10° C. under an atmosphere of nitrogen and heated at 100-110° for 6 hours as in Example III, giving 5-10% of liquid polymer. The catalytic effect of oxygen is evident from a comparison of this result with that of Example III.

*Example V*

Example IV may be repeated but with the addition of 1% of benzoyl peroxide, thus giving 25-30% of non-volatile polymer.

*Example VI*

Gaseous vinylacetylene is dissolved in an equimolecular quantity of cold toluene and then heated at 100-110° for 6 hours under an atmosphere of nitrogen giving less than 4% of benzene soluble polymer.

*Example VII*

Example VI is repeated only at a temperature of 150° giving 20-30% of benzene soluble polymer in 2 hours.

*Example VIII*

Vinylacetylene containing 1% of benzoyl peroxide is introduced into a nickel coil, 60 feet long and held at a temperature of 110° under a pressure equivalent to the vapor pressure of the mixture, namely 10-20 atmospheres, and at such a rate that it travels the length of the coil in 5-6 hours; the material removed from the other end of the coil as fresh vinylacetylene is introduced, being continuously distilled and the recovered vinylacetylene being returned to storage for introduction into the tube again. In this manner, 20-25% of the vinylacetylene is converted into the liquid polymer per cycle through the coil.

*Example IX*

In the manner of Example V vinylacetylene is heated for 6 hours in a closed system with 1% of manganese dioxide at 110° giving 15-20% polymerization.

*Example X*

Example IX is repeated replacing the manganese dioxide with sodium perborate, thus producing approximately 12-15% of polymer.

*Example XI*

A solution containing one part of vinylacetylene, one part of toluene and 0.005 parts of benzoyl peroxide is continuously introduced into a nickel coil, 60 feet long and held at a temperature of 120° C. under a pressure of 10-15 atmospheres and at such a rate that it travels the length of the coil in 5-6 hours; the material removed from the other end of the coil as fresh vinylacetylene is introduced, being continuously distilled, and the recovered vinylacetylene returned to storage for introduction into the tube again. In this manner 40-50% of the vinylacetylene is converted into polymer per cycle through the coil.

Concerning the boiling point of the product of Example XI, the thick viscous oil resulting is essentially non-volatile. If it were subjected to the process of distillation, a very small quantity might distil at an indefinite temperature substantially above 100°; under conditions of very low pressure, a second small quantity of material might be distilled off at an indefinite temperature, leaving the great majority of the product, somewhat more viscous as a result of this distillation but in itself, non-volatile under any known conditions of temperature and pressure which will not result in decomposition of the product.

The following examples disclose the preparation of the gelatinous and solid polymers of vinylacetylene discussed above.

*Example XII*

One hundred parts of liquid vinylacetylene are sealed in a closed tube together with 1 part of benzoyl peroxide and the mixture heated for 20 hours at 110° C. Upon opening the tube at the end of this period, the product is found to be light yellow colored, gelatinous polymer, of which a small portion is soluble in benzene. This semi-solid material is characteristically unsaturated, absorbing oxygen from the air, reacting with halogens and violently charring when treated with strong sulfuric acid.

*Example XIII*

The process of Example XII is repeated, but in this case, heating is continued for 200 hours at 110°. At the end of this time, the product is a light yellow-brown resinous solid. This material is very hard and brittle; it has a density greater than 1, and is insoluble in all common solvents. This hard solid polymer is relatively inert; it does not react with oxygen of the air, nor with halogens, probably by virtue of its physical form. It is practically unchanged by treatment with strong sulfuric acid, strong alkalies or other corrosive chemical agents. It is slowly oxidized by treatment with strong nitric acid or other strong oxidizing agents, and similarly, it has been found to slowly burn in air with the formation of heavy deposits of carbon.

It will be obvious from the above examples that the polymerized products may be obtained in a variety of ways and that the duration of treatment required to produce a given polymer or polymer mixture will depend upon the particular method employed. Pressures above atmospheric facilitate polymerization of the vinylacetylene but are not essential. Although its rate of polymerization at temperatures below its boiling point is extremely slow and, since the boiling point is substantially below ordinary temperatures, if stored at room temperatures, it must be kept under pressure. The degree of heating may be varied over a wide range; temperatures as low as room temperature will result in a very slow polymerization, 10-13% of polymer being formed in 4-6 month's time. Increase of temperature results in a very marked increase in the rate of polymerization, thus temperatures between 25° and 200° have been found useful, though great care should be exercised in operating at temperatures above 110° for the danger of explosion is very great. For this reason, we prefer the temperature range between 50° and 110° in the absence of a solvent.

Polymerization catalysts may or may not be used, as desired. As catalysts for this polymerization, the following materials and groups of substances have, for example, been found effective: alkali metals, such as lithium, sodium and potassium; alkaline earth metals such as calcium and barium; alloys of these metals with themselves or others, such as the eutectic of sodium and potassium; halides of certain metals such as aluminum chloride, zinc chloride and cuprous chloride; halides of non-metals and metalloids such as stannous and stannic chloride, antimony tri- and pentachloride, arsenic tri- and pentachloride, sulfur monochloride, titanium tetrachloride, boron fluoride etc.; certain acids such as sulfuric acid, phosphoric acid, chlorosulfuric acid, fluoroboric acid and formic acid; oxygen; peroxides such as sodium peroxide, barium peroxide, manganese dioxide, hydrogen peroxide, and benzoyl peroxide; percarbonates, perborates, persulfates and other persalts; anhydrides such as acetic anhydride, maleic anhydride and phthalic anhydride. The rate of polymerization in each of these cases is proportional to the quantity of catalyst used, each catalyst being different in regard to the quantity necessary to produce a definite rate of polymerization. Any quantity of catalyst may be used as desired, but we prefer to use less than 2%. It will be understood that the term catalyst as employed herein denotes a compound adapted to accelerate polymerization other than the previously disclosed Nieuwland catalyst which as already explained is not adapted to the purposes of this invention.

Vinylacetylene and its polymers absorb oxygen upon exposure to air and the oxygen so absorbed acts catalytically in the process of polymerization. This may, if desired, be avoided by carrying out the polymerization in the absence of air, for example, under an atmosphere of nitrogen. If allowed complete access to air, the polymerization is rapid and the tendency to become semi-solid or gel-like becomes greater; thus in an atmosphere of nitrogen, the products may be stored for many months at room temperature, whereas in air, polymerization and oxidation will cause gelling at room temperature in several days. Further, excessive oxidation may result in the formation of explosive oxides, hence the use of oxygen and peroxides as catalysts must be limited to small amounts.

The polymerization may or may not be carried out in solution as desired. The following solvents, for example, have been found valuable under various conditions of operation: acetic acid, methyl alcohol, ethyl alcohol, propylalcohol, isopropyl alcohol, butyl alcohol, isobutyl alcohol, acetone, methyl acetate, ethylacetate, propyl acetate, butyl acetate, methyl butyrate, ethyl butyrate, butyl butyrate, other esters of low molecular weight, solvent naphtha, benzene, xylene, toluene, tetrahydronaphthalene, decahydronaphthalene, cyclohexane, cyclohexanol, methylcycylohexane, pentane, hexane, heptane, octane, and other saturated hydrocarbons. The aromatic hydrocarbon solvents such as toluene, xylene and solvent naphtha are among the preferred solvents.

The amount of solvent employed may be varied without limit. In general, however, concentrations of from 10 to 80% of vinylacetylene (by weight) are used. Since the presence of a solvent acts to slow down the polymerization, the rate of the reaction may be conveniently controlled by the addition of the solvent in appropriate quantities. When the polymerization is thus controlled, the danger of the formation of excessive quantities of the less desirable higher polymers is greatly diminished. In the event that a solvent is used, higher temperatures may also be used with safety, for the vapor pressure of the system may be decreased and the danger of spontaneous decomposition of the acetylene compound greatly reduced. In this manner, temperatures up to 200° have been successfully used, although temperatures between about 80° and 150° C. are preferred. By means of such temperatures the retarding effect of the solvent may be overbalanced and the process even speeded up.

As will be evident from the examples, various methods may be used for carrying out the polymerization. First, gaseous vinylacetylene may be dissolved in a cold liquid solvent, enclosed in an air-tight system and heated, thus accomplishing the polymerization directly in the solvent. Second, it may be liquefied and enclosed in an air-tight container either with or without a solvent and subsequently polymerized. Thirdly, it may be slowly passed through a heated tube, with or without solvent, the vinylacetylene being introduced under pressure, if necessary, and the rate of flow being adjusted so that the desired degree of polymerization will be accomplished by the time the product is drawn off at the other end. In each of these methods, it has been found advisable, although not necessary, in preparing the viscous liquid polymer to only partially polymerize and then recover the unpolymerized material by distillation, returning it to the polymerizer. In this manner, the formation of solid gelatinous products is avoided and a polymer of much higher solubility is obtained. However, in the case of polymerization in solution, the degree of polymerization may be carried much higher than in the absence of a solvent. Thus, where a sample of pure vinylacetylene may gel when it is polymerized to the extent of 30%, a 50% solution of vinylacetylene in toluene may be polymerized until over 75% of the available vinylacetylene is in the form of polymers without gelling. The preferred degree of polymerization lies between 10 to 30% polymerization in the case of straight vinylacetylene and 10 to 95% in the case of vinylacetylene in solution.

Regardless of the particular process the resulting products all differ from the products obtainable from known hydrocarbons by polymerization in that they are more highly unsaturated and absorb oxygen in the manner of bodied drying oils. Thus, the liquid non-volatile polymers constitute a new class of synthetic drying oils suitable for compounding as paints and lacquers. After drying in air, the films formed by these polymers are highly resistant to chemical action. In most respects the products are comparable to those illustrated in the Nieuwland case, Serial No. 330,415, but are lighter in color and softer and the liquids on standing furnish films displaying greater toughness, better adhesion and greater light stability than those obtained by the polymerization of divinylacetylene or of mixtures containing the same. These products are, therefore, new compositions of matter consisting of polymers of vinylacetylene in substantially pure form and possessing acetylenic side chains, namely side chains composed of the group $-C\equiv C-H$.

It is not the intention to claim herein products resulting from cross polymerization or from simultaneous polymerization of vinylacetylene with other polymerizable substances.

As many apparent and widely different embodiments of this invention may be made without departing from the spirit thereof, it is to be understood that we do not limit ourselves to the foregoing examples or descriptions except as indicated in the following claims.

We claim:

1. A polymer product resulting from polymerizing substantially pure vinylacetylene in the absence of other polymerizable substances.

2. A polymer of vinylacetylene in pure form and having the empirical formula $(C_4H_4)_x$ wherein $x$ is a whole number greater than one and which will react with ammoniacal cuprous copper to yield an acetylide.

3. A hydrocarbon product obtainable by heating substantially pure vinylacetylene and varying from a transparent liquid soluble in alcohol, acetone and benzene, to a transparent, hard brittle resin substantially insoluble in said solvents.

4. A substantially pure polymer of vinylacetylene obtainable by heating the same in a closed tube with 1 part of benzoyl peroxide for 20 hours at 110° C., said product being partially soluble in benzene, of a semi-solid gelatinous consistency and adapted to harden on exposure to air.

5. A substantially pure polymer of vinylacetylene obtainable by heating the same in a closed tube with 1 part of benzoyl peroxide for 200 hours at 110° C., said product being a hard, brittle solid, insoluble in benzene.

6. A viscous non-volatile liquid polymerization product of pure vinylacetylene soluble in benzene, adapted to harden on exposure to air and yielding acetylides when reacted with ammoniacal cuprous copper.

7. A liquid polymerization product of pure vinylacetylene, said polymer being polymerized to a degree corresponding to that resulting from heating substantially pure vinylacetylene in a closed vessel and in the presence of an equal volume of air at a temperature of from 80 to 90° C. for 15 to 30 hours.

8. A substantially pure polymer of vinylacetylene obtainable by heating the same in pure form in a closed vessel without access of air for from 5 to 6 hours at a temperature of from 100 to 110° C. and thereafter removing those products boiling at or below 100° C.

9. A liquid hydrocarbon obtainable by mixing 1 part of substantially pure vinylacetylene with 0.005 parts of benzoyl peroxide and 1 part of toluene and exposing the mixture in a thin stream and in the absence of air to a temperature of 120° C. and a pressure of 10 to 15 atmospheres for 5 or 6 hours and removing from the resulting product those products boiling at or below 100° C., said hydrocarbon being soluble in benzene, adapted to oxidize on standing in air and reacting with ammoniacal cuprous copper to yield acetylides.

10. In the process of producing hydrocarbons of higher molecular weight from monovinylacetylene, the step which comprises polymerizing vinylacetylene in the absence of other polymerizable substances.

11. In the process of producing hydrocarbons of higher molecular weight from monovinylacetylene, the step which comprises polymerizing vinylacetylene in the presence of air and in the absence of other polymerizable substances.

12. In the process of producing hydrocarbons of higher molecular weight from monovinylacetylene, the step which comprises polymerizing vinylacetylene in the absence of air and other polymerizable substances.

13. The process of producing hydrocarbons which comprises heating vinylacetylene to a temperature of from 25 to 200° C. and in the absence of other polymerizable substances.

14. The process of producing hydrocarbons which comprises heating vinylacetylene in the presence of an inert solvent and in the absence of other polymerizable substances.

15. The process of producing non-benzenoid hydrocarbons which comprises heating vinylacetylene to from 50 to 150° C. in the presence of a polymerization catalyst other than a cuprous chloride, ammonium salt solution and in the absence of other polymerizable substances.

16. The process of producing an unsaturated hydrocarbon from vinylacetylene which comprises heating the vinylacetylene in the absence of other polymerizable substances to a temperature below 200° C. to obtain a liquid polymer mixture and distilling off that portion of the mixture boiling below 100° C.

17. The process of claim 16 in which the vinylacetylene is heated in a closed vessel in the presence of air to effect polymerization of at least 10% of the vinylacetylene to products boiling above 100° C.

18. The process of claim 16 in which the vinylacetylene is heated to a temperature between 50 and 110° C. in a closed vessel and in the absence of a solvent until between 10% and 30% of the vinylacetylene has been polymerized to products boiling above 100° C.

19. The process of producing a polymer of vinylacetylene in which the vinylacetylene is heated in the absence of air and in the presence of an inert solvent to effect polymerization of from 10 to 95% of the vinylacetylene to a non-volatile product.

20. The process of claim 11 in which the vinylacetylene is heated in the presence of substantially 20% to 90% of its weight of an aromatic hydrocarbon solvent until between 10 and 95% of the vinylacetylene has been polymerized to products boiling above 100° C.

21. The process of claim 11 in which the vinylacetylene is heated to a temperature of from 80 to 150° C. in the presence of substantially 20% to 90% of its weight of an aromatic hydrocarbon solvent until substantially 40–50% of the vinylacetylene has been polymerized to products boiling above 100° C.

22. The process of producing a polymer of vinylacetylene in which the vinylacetylene in otherwise pure form, together with an aromatic hydrocarbon solvent and a catalyst is continuously passed through a coil heated to a temperature below 200° C. to effect partial polymerization of the vinylacetylene to non-volatile products, continuously separating the non-volatile products from the mixture discharged from the coil and reintroducing the volatile products with the fresh vinylacetylene into the coil.

23. The process of claim 20 in which the degree of polymerization of the liquid corresponds to that obtainable by exposing 1 part of vinylacetylene with 0.005 parts of benzoyl peroxide and 1 part of toluene in a thin stream in the absence of air to a temperature of from 80 to 150° C. for from 5 to 6 hours.

In testimony whereof we affix our signatures.

ALBERT S. CARTER.
FREDERICK B. DOWNING.